(12) United States Patent
Matsui et al.

(10) Patent No.: US 12,473,460 B2
(45) Date of Patent: Nov. 18, 2025

(54) CROSSLINKED POLYOLEFIN RESIN FOAM, ADHESIVE TAPE, LAYERED BODY, MOLDING, AND DISPLAY MEMBER

(71) Applicant: SEKISUI CHEMICAL CO., LTD., Osaka (JP)

(72) Inventors: Rie Matsui, Hasuda (JP); Hiroki Mikami, Koga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 904 days.

(21) Appl. No.: 17/764,303

(22) PCT Filed: Sep. 29, 2020

(86) PCT No.: PCT/JP2020/036930
§ 371 (c)(1),
(2) Date: Mar. 28, 2022

(87) PCT Pub. No.: WO2021/065916
PCT Pub. Date: Apr. 8, 2021

(65) Prior Publication Data
US 2022/0372336 A1  Nov. 24, 2022

(30) Foreign Application Priority Data
Sep. 30, 2019  (JP) ................ 2019-180179

(51) Int. Cl.
*C09J 7/24* (2018.01)
*C09J 7/26* (2018.01)
*C09J 7/38* (2018.01)

(52) U.S. Cl.
CPC ............ *C09J 7/243* (2018.01); *C09J 7/26* (2018.01); *C09J 7/38* (2018.01); *C09J 2203/326* (2013.01); *C09J 2203/354* (2020.08); *C09J 2301/122* (2020.08); *C09J 2301/16* (2020.08); *C09J 2301/302* (2020.08)

(58) Field of Classification Search
CPC .. C09J 7/243; C09J 7/26; B32B 9/046; B32B 27/365; B32B 2255/102; B32B 2266/025; B32B 5/02; B32B 2457/20; B32B 5/245; B32B 9/025; B32B 27/302; B32B 27/304; B32B 27/308; B32B 27/32; B32B 27/36; B32B 27/40; B32B 15/046; B32B 2274/00; B32B 5/022; B32B 2307/412; B32B 2605/003; B32B 5/026; B32B 5/18; C08J 2203/04; C08J 9/103; C08J 2323/16; C08J 9/0066; C08J 2201/026; C08J 2201/03; C08J 2207/02; C08J 2423/06; C08J 2423/08; C08J 2423/16; C08J 9/04; C08J 2323/10; C08J 2323/01; C08J 2423/04; C08L 23/12; C08L 23/04; C08K 5/1345

See application file for complete search history.

(56) References Cited

U.S. PATENT DOCUMENTS

| | | | |
|---|---|---|---|
| 2015/0183142 A1 | 7/2015 | Baldwin et al. | |
| 2021/0087348 A1* | 3/2021 | Shimura | C08J 9/103 |
| 2021/0340347 A1* | 11/2021 | Matsui | C08J 9/0061 |

FOREIGN PATENT DOCUMENTS

| | | |
|---|---|---|
| EP | 3 279 244 | 2/2018 |
| JP | 7-145259 | 6/1995 |
| JP | 8-67757 | 3/1996 |
| JP | 2002-219781 | 8/2002 |
| JP | 2008-250309 | 10/2008 |
| JP | 2013-203984 | 10/2013 |
| JP | 2017-503889 | 2/2017 |
| JP | 2017-190375 | 10/2017 |
| JP | 2017-190432 | 10/2017 |
| JP | 2018-53224 | 4/2018 |
| JP | 2019-59819 | 4/2019 |

OTHER PUBLICATIONS

International Search Report (ISR) issued Dec. 8, 2020 in International (PCT) Application No. PCT/JP2020/036930.

* cited by examiner

*Primary Examiner* — Kevin R Kruer
(74) *Attorney, Agent, or Firm* — Wenderoth, Lind & Ponack, L.L.P.

(57) ABSTRACT

A cross-linked polyolefin resin foam of the present invention has a total light transmittance and a thickness that satisfy a predetermined condition, and has a reflection color difference $\Delta^*$ of −10 to 16, a reflection color difference $\Delta a^*$ of −3 to 3, and a reflection color difference $\Delta L^*$ of 50 or more. According to the present invention, there can be provided a cross-linked polyolefin resin foam that can suppress a change in color tone of transmitted light while ensuring transparency, and a pressure-sensitive adhesive tape, layered product, formed product, and display member that include such a cross-linked polyolefin resin foam.

14 Claims, No Drawings

CROSSLINKED POLYOLEFIN RESIN FOAM, ADHESIVE TAPE, LAYERED BODY, MOLDING, AND DISPLAY MEMBER

TECHNICAL FIELD

The present invention relates to a cross-linked polyolefin resin foam, a pressure-sensitive adhesive tape, a layered product, a formed product, and a display member.

BACKGROUND ART

In vehicles such as automobiles, light display members that use light to display information on the temperature, time, vehicle speed, and the like have been actively developed in recent years from the viewpoint of improving the performance of such display members. In order to properly display information, the light display member needs to have excellent light transmittance, and since the display member forms a part of the interior of the vehicle, a sense of quality, such as maintaining a soft tactile feel and excellent design, is required.

Foam is known as a material having flexibility. In addition to flexibility, foam has excellent cushioning and thermal insulation properties, and is thus used in various industrial fields. In addition, foams having improved light transmittance are also being developed. For example, Patent Literature 1 proposes a polyolefin resin foam having a closed cell structure, wherein a total light transmittance is 15% or more, and the shrinkage ratio in the length direction (MD) and width direction (TD), the average cell diameter in the length direction (MD), the thickness, the apparent density, and the 25% compressive hardness are adjusted to be in specific ranges. Further, Patent Literature 2 proposes an acrylic resin foam characterized by having an average cell diameter of 1.2 mm or more. In Patent Literature 1 and 2, the light transmittance of the foam is improved mainly by adjusting the average cell diameter.

In addition, Patent Literature 3 proposes an insulating foam made of a thermoplastic resin having a total light transmittance of 80% or more, characterized by having an expansion ratio of 5 to 100 times, and an average cell diameter of 1 to 15 mm. In Patent Literature 3, the light transmittance of the foam is improved by using a resin having a high total light transmittance such as methyl methacrylate.

CITATION LIST

Patent Literature

PTL 1: JP 2017-190375 A
PTL 2: JP 2013-203984 A
PTL 3: JP 08-067757 A

SUMMARY OF INVENTION

Technical Problem

However, there is room for improvement for polyolefin resin foams because total light transmittance decreases when the thickness of the foam increases even when the average cell diameter is adjusted like in Patent Literature 1. On the other hand, although there are cases where the problem of light transmittance is solved by using an acrylic resin foam as in Patent Literatures 2 and 3, there is a problem in that the acrylic resin foams have worse mechanical properties, flexibility and the like compared to foams that have been crosslinked by an electron beam, such as polyolefin resin foams. For this reason, it is desirable to improve the light transmittance of the foam using a polyolefin resin. In addition, when light of a predetermined color is transmitted through the foam described in Patent Literatures 1 to 3, the color tone of the light changes. When a foam is used for a light display member, it is desirable that when light of a predetermined color is transmitted through the foam, the color tone of the emitted light does not change.

Accordingly, it is an object of the present invention to provide a cross-linked polyolefin resin foam that can suppress a change in color tone of transmitted light while ensuring transparency, and a pressure-sensitive adhesive tape, layered product, formed product, and display member that include such a cross-linked polyolefin resin foam.

Solution to Problem

As a result of intensive research, the present inventors have found that a cross-linked polyolefin resin foam having a total light transmittance and thickness that satisfy a specific relation and that has a reflection color difference within a predetermined range can solve the problem described above, and thereby completed the present invention.

That is, the present invention relates to the following [1] to [13].

[1] A cross-linked polyolefin resin foam, satisfying the following equation (1), when a total light transmittance is taken to be y % and a thickness is taken to be x mm:

$$y \geq 29.631 \times x^{-0.352} \tag{1}$$

and having a reflection color difference $\Delta b^*$ of $-10$ to $16$, a reflection color difference $\Delta a^*$ of $-3$ to $3$, and a reflection color difference $\Delta L^*$ of $50$ or more.

[2] The cross-linked polyolefin resin foam according to [1], wherein the thickness is 0.1 to 10 mm.

[3] The cross-linked polyolefin resin foam according to [1] or [2], wherein
the cross-linked polyolefin resin foam is obtained by foaming an expandable composition including a polyolefin resin and a foaming agent, and
the foaming agent has an average particle size of 25 μm or less.

[4] The cross-linked polyolefin resin foam according to any one of [1] to [3], wherein
the cross-linked polyolefin resin foam is obtained by foaming an expandable composition including a polyolefin resin, a foaming agent, and a foaming aid, and
the foaming aid includes a metal oxide.

[5] The cross-linked polyolefin resin foam according to [3] or [4], wherein the polyolefin resin includes at least one of a polypropylene resin and a polyethylene resin.

[6] The cross-linked polyolefin resin foam according to any one of [3] to [5], wherein the polyolefin resin further includes at least one of an ethylene-vinyl acetate copolymer and an ethylene-propylene random copolymer.

[7] A pressure-sensitive adhesive tape including:
the cross-linked polyolefin resin foam according to any one of [1] to [6]; and
a pressure-sensitive adhesive layer provided on at least one side of the cross-linked polyolefin resin foam.

[8] A layered product including:
the cross-linked polyolefin resin foam according to any one of [1] to [6]; and a transparent film layer provided on at least one side of the cross-linked polyolefin resin foam.

[9] A layered product including:
the cross-linked polyolefin resin foam according to any one of [1] to [6]; and
at least one layer of a printed layer and a printed film provided on at least one side of the cross-linked polyolefin resin foam.

[10] A formed product obtained by forming the cross-linked polyolefin resin foam according to any one of [1] to [6].

[11] The formed product according to [10], wherein a skin material is layered on the cross-linked polyolefin resin foam.

[12] The formed product according to [10] or [11], wherein the formed product is an automobile interior material.

[13] A display member including the cross-linked polyolefin resin foam according to any one of [1] to [6].

[14] The display member according to [13], including a sensor element.

Advantageous Effects of Invention

According to the present invention, there can be provided a cross-linked polyolefin resin foam that can suppress a change in color tone of transmitted light while ensuring transparency, and a pressure-sensitive adhesive tape, layered product, formed product, and display member that include such a cross-linked polyolefin resin foam.

DESCRIPTION OF EMBODIMENTS

[Cross-Linked Polyolefin Resin Foam]
(Total Light Transmittance)

The cross-linked polyolefin resin foam of the present invention (hereinafter sometimes simply referred to as "foam") satisfies the following equation (1) when a total light transmittance is taken to be y % and a thickness is taken to be x mm.

$$y \geq 29.631 \times x^{-0.352} \tag{1}$$

When the cross-linked polyolefin resin foam of the present invention does not satisfy equation (1), when the foam is used for a display member, unless the foam is made thinner than necessary at the expense of soft tactile feel, mechanical strength, and the like, the transparency of foam may be insufficient. From such a viewpoint, it is preferable that the following equation (1A) is satisfied, more preferable that equation (1B) is satisfied, and further preferable that equation (1C) is satisfied. The total light transmittance and thickness of the foam are measured by the methods described in the examples, which are described later.

$$y \geq 29.631 \times x^{-0.352} + 5 \tag{1A}$$

$$y \geq 29.631 \times x^{-0.352} + 10 \tag{1B}$$

$$y \geq 29.631 \times x^{-0.352} + 15 \tag{1C}$$

When the foam is used for a display member, from the viewpoint of having a good balance between a soft tactile feel and mechanical strength of the foam and sufficient transparency, the total light transmittance of the foam is preferably 45% or more, and more preferably 46% or more when the foam thickness is 0.3 mm or more and less than 1.0 mm.

Further, from the same viewpoint, the total light transmittance of the foam is preferably 30% or more, more preferably 34% or more, and further preferably 40% or more when the foam thickness is 1.0 mm or more and less than 2.0 mm.

In addition, from the same viewpoint, the total light transmittance of the foam is preferably 20% or more, more preferably 30% or more, and further preferably 35% or more when the foam thickness is 2.0 mm or more and 4.0 mm or less.

The higher the total light transmittance of the foam the better, but the total light transmittance is, for example, 90% or less.

(Reflection Color Difference)

The foam of the present invention has a reflection color difference $\Delta b^*$ of $-10$ to $16$. When the reflection color difference $\Delta b^*$ of the foam is less than $-10$ or greater than 16, the change in the color tone of the light that passes through the foam increased, and the color of the light may change due to the light passing through the foam. In particular, for light display members used in the vehicles, the use of blue LEDs is being studied. By setting the reflection color difference $\Delta b^*$ of the foam within the above range, the change in the color tone of light that passes through the foam can be suppressed even if a blue LED is used. From this viewpoint, the reflection color difference $\Delta b^*$ of the foam is preferably $-10$ to $15$, more preferably $-5$ to $10$, and further preferably $-3$ to $8$. From the same point of view, the foam has a reflection color difference $\Delta a^*$ of $-3$ to $3$, preferably $-2$ to $2$, and more preferably $-1$ to $1$. The reflection color differences $\Delta b^*$ and $\Delta a^*$ of the foam are measured by the method described in the examples, which are described later.

The foam of the present invention has a reflection color difference $\Delta L^*$ of 50 or more. When the reflection color difference $\Delta L^*$ of the foam is less than 50, the color of the light may become very pale and the vividness of the color of the light may be greatly reduced, when light passes through the foam. From this viewpoint, the reflection color difference $\Delta L^*$ of the foam is preferably 75 or more, and more preferably 80 or more. The reflection color difference $\Delta L^*$ of the foam is measured by the method described in the examples, which are described later.

The total light transmittance and the reflection color difference of the foam can be adjusted according to the type of resin in the foam, the types of additives in the foam, the particle size, resin type, and the like. In particular, the total light transmittance and the reflection color difference can be adjusted to within the above range by appropriately adjusting the type and particle size of a foaming agent, whether or not a foaming aid is added, and the type and blending amount of such a foaming aid.

(Foam Thickness)

From the viewpoint of the light transmittance of the foam, changes in the color tone of the light that passes through the foam, a soft tactile feel and mechanical strength of the foam, the thickness of foam of the present invention is preferably 0.1 to 10 mm, more preferably 0.5 to 7 mm, further preferably 1 to 4 mm, and still further preferably 2 to 4 mm.

(Foam Expansion Ratio)

The foam of the present invention has an expansion ratio of preferably 5 to 40 times. When the foam expansion ratio is 5 times or more, it is easier to achieve a good soft tactile feel for the foam. When the foam expansion ratio is 40 times or less, a good mechanical strength of the foam can be achieved. From this viewpoint, the foam expansion ratio is more preferably 6 to 35 times, further preferably 7 to 33 times, and still further preferably 10 to 33 times. The foam expansion ratio is measured by the method described in the examples, which are described later.

(Foam 25% Compressive Strength)

The foam of the present invention has a 25% compressive strength of preferably 30 to 150 kPa. When the 25% compressive strength of the foam is 30 kPa or more, a foam having a mechanical strength sufficient to be used as a display member can be obtained. When the 25% compressive strength of the foam is 150 kPa or less, a foam having a sufficiently soft tactile feel can be obtained. From this viewpoint, the 25% compressive strength of the foam of the present invention is preferably 33 to 140 kPa, and more preferably 35 to 130 kPa. The 25% compressive strength of the foam is measured by the method described in the examples, which are described later.

(Expandable Composition)

From the viewpoint of easily obtaining a foam having the above-described total light transmittance and reflection color difference, the foam of the present invention is preferably a foam obtained by foaming an expandable composition including a polyolefin resin. From this viewpoint, the content of the polyolefin resin with respect to 100 parts by mass of the resin component of the expandable composition is preferably 80 to 100 parts by mass, more preferably 90 to 100 parts by mass, and further preferably 95 to 100 parts by mass. Further, to the extent that the effect of the present invention is not inhibited, the expandable composition may include a resin other than a polyolefin resin. Examples of such a resin component include an ethylene-acrylic acid copolymer, an ethylene-(meth)alkylacrylate copolymer, and a modified copolymer obtained by copolymerizing these with maleic acid anhydride.

Examples of the polyolefin resin included in the expandable composition include a polyethylene resin, a polypropylene resin, an ethylene-vinyl acetate copolymer, an ethylene-propylene random copolymer, and the like. Among these, from the viewpoint of obtaining a colorless transparent foam, the polyolefin resin preferably includes at least one of a polypropylene resin and a polyethylene resin, and more preferably the polyolefin resin includes both a polypropylene resin and a polyethylene resin.

In particular, when the expandable composition includes a polypropylene resin as the polyolefin resin, the foam generally yellows due to the influence of additives, processing temperature, and the like. However, in the present invention, by appropriately adjusting the type and particle size of the foaming agent, as well as the type and blending amount of the additives, the yellowing of the foam is suppressed, and the total light transmittance and reflection color difference can be adjusted to within the predetermined ranges described above.

<Polypropylene Resin>

The polypropylene resin may be, for example, a homopolypropylene, which is a homopolymer of propylene, or a copolymer of propylene and a small amount of ethylene and an α-olefin other than propylene in which propylene is the principal component (preferably 75% by mass or more of all the monomers, and more preferably 90% by mass or more).

Examples of the copolymer of propylene and ethylene and an α-olefin other than propylene include a block copolymer (block polypropylene), a random copolymer (random polypropylene), a random block copolymer, and the like. As the polypropylene resin, a random copolymer is preferable from the viewpoints of flexibility, mechanical strength, transparency, and the like.

Examples of the α-olefin other than propylene include α-olefins having about 4 to 10 carbon atoms, such as 1-butene, 1-pentene, 1-hexene, 4-methyl-1-pentene, 1-heptane, and 1-octene. Among these, ethylene is preferable from the viewpoint of formability and heat resistance. In the copolymer, these α-olefins can be used alone or in combination of two or more.

Further, the polypropylene resin may be used alone or in combination of two or more.

When the polyolefin resin includes a polypropylene resin, the content of the polypropylene resin in the polyolefin resin is preferably 40 to 100% by mass, more preferably 45 to 100% by mass, and further preferably 50 to 100% by mass.

These polypropylene resins can be used alone or in combination of two or more.

<Polyethylene Resin>

Examples of the polyethylene resin include a low-density polyethylene resin (0.93 g/cm$^3$ or less, LDPE), medium-density polyethylene resin (0.930 g/cm$^3$ or more and less than 0.942 g/cm$^3$, MDPE), and a high-density polyethylene resin (0.942 g/cm$^3$ or more, HDPE). Further, suitable examples of the low-density polyethylene resin include a linear low-density polyethylene resin (LLDPE).

Among these, a low-density polyethylene resin is preferable, and a linear low-density polyethylene resin is more preferable. By using these resins, a foam having the above-described total light transmittance and reflection color difference can be easily obtained.

The density of the linear low-density polyethylene resin is preferably 0.90 g/cm$^3$ or more, and more preferably 0.91 g/cm$^3$ or more and 0.93 g/cm$^3$ or less. By setting the density of the linear low-density polyethylene resin to within these ranges, a foam having the above-described total light transmittance and reflection color difference can be easily obtained.

The polyethylene resin may be a homopolymer of ethylene, but may also be a copolymer or the like of ethylene and a small amount of an α-olefin in which ethylene is the principal component (preferably 75% by mass or more of all the monomers, and more preferably 90% by mass or more). Examples of the α-olefin include α-olefins having preferably 3 to 12 carbon atoms, and more preferably 4 to 10 carbon atoms. Specific examples include 1-butene, 1-pentene, 1-hexene, 4-methyl-1-pentene, 1-heptene, 1-octene, and the like. In the copolymer, these α-olefins can be used alone or in combination of two or more.

Further, the polyethylene resin may be used alone or in combination of two or more.

When the polyolefin resin includes a polyethylene resin, the content of the polyethylene resin in the polyolefin resin is preferably 5 to 100% by mass, more preferably 10 to 100% by mass, and further preferably 15 to 100% by mass.

These polyethylene resins can be used alone or in combination of two or more.

In the present invention, any of a polyethylene resin, polypropylene resin, or mixture thereof polymerized with a polymerization catalyst such as a Ziegler-Natta compound, a metallocene compound, or a chromium oxide compound, may be used. By using a polypropylene resin, in particular a random polypropylene, obtained with a metallocene compound polymerization catalyst, it is easier to obtain a foam having high flexibility and total light transmittance.

The polyolefin resin included in the expandable composition may further include at least one of an ethylene-vinyl acetate copolymer and an ethylene-propylene random copolymer. By doing so, the values of the reflection color difference Δb* and the reflection color difference Δa* of the foam of the present invention can be reduced, and the values of the reflection color difference Δb* and the reflection color difference Δa* of the foam of the present invention can be adjusted.

<Ethylene-Vinyl Acetate Copolymer>

Examples of the ethylene-vinyl acetate copolymer (EVA) include an ethylene-vinyl acetate copolymer in which the content (VA amount) of vinyl acetate is preferably 5 to 40% by mass, more preferably 12 to 35% by mass, and further preferably 15 to 30% by mass. When the content of vinyl acetate in the ethylene-vinyl acetate copolymer is within the above range, a foam having the above-described reflection color difference can be easily obtained.

In the present invention, for example, two or more types of copolymer having different molecular weights, different amounts of vinyl acetate of the copolymer component, different melting points, and the like can be used in combination.

The ethylene-vinyl acetate copolymer used in the present invention may include, in addition to ethylene and vinyl acetate, a vinyl alcohol produced by hydrolyzing a portion of vinyl acetate.

Examples of such ethylene-vinyl acetate copolymers include "Ultrasen" manufactured by Tosoh Corporation, "Evaflex" manufactured by Dupont-Mitsui Polychemicals Co., Ltd., "UBE polyethylene" manufactured by Ube-Maruzen Polyethylene Co., Ltd., "Suntec" manufactured by Asahi Kasei Chemicals Corporation, and the like.

When the polyolefin resin includes an ethylene-vinyl acetate copolymer, the content of the ethylene-vinyl acetate copolymer in the polyolefin resin is preferably 1 to 20% by mass, more preferably 2 to 10% by mass, and further preferably 3 to 8% by mass.

These ethylene-vinyl acetate copolymers can be used alone or in combination of two or more.

<Ethylene-Propylene Random Copolymer>

The ethylene-propylene random copolymer is an amorphous or low crystalline rubbery substance in which ethylene and propylene are substantially randomly copolymerized.

The ethylene-propylene random copolymer may have other monomer units in addition to an ethylene unit and a propylene unit. Monomers forming other monomer units include: conjugated dienes having 4 to 8 carbon atoms, such as 1,3-butadiene, 2-methyl-1,3-butadiene (isoprene), 1,3-pentadiene, and 2,3-dimethyl-1,3-butadiene; non-conjugated dienes having 5 to 15 carbon atoms, such as dicyclopentadiene, 5-ethyliden-2-norbornene, 1,4-hexadiene, 1,5-dicyclooctadiene, 7-methyl-1,6-octadiene, and 5-vinyl-2-norbornene; vinyl ester compounds such as vinyl acetate; unsaturated carboxylic acid esters such as methyl acrylate, ethyl acrylate, butyl acrylate, methyl methacrylate, and ethyl methacrylate; unsaturated carboxylic acids such as acrylic acid and methacrylic acid, and the like. These monomers can be used alone or in combination of two or more. Among these, non-conjugated dienes having 5 to 15 carbon atoms is preferable, and from the viewpoint of availability, 5-ethyliden-2-norbornene, 1,4-hexadiene, and dicyclopentadiene (DCPD) are more preferable, and 5-ethyliden-2-norbornene is more preferable.

The content of the ethylene unit of the ethylene-propylene random copolymer is usually 30 to 85% by mass, preferably 40 to 80% by mass, and more preferably 45 to 75% by mass, the content of the propylene unit is usually 10 to 60% by mass, and preferably 15 to 50% by mass, and the content of the other monomer units such as a non-conjugated diene is usually 0 to 20% mass, and preferably 0 to 10% by mass.

Ethylene-propylene copolymer rubber (EPM) and ethylene-propylene-diene copolymer rubber (EPDM) are more preferable as the ethylene-propylene random copolymer, and EPM is further preferable. Examples of EPDM include ethylene-propylene-5-ethyliden-2-norbornene copolymer rubber, ethylene-propylene-1,4-hexadiene copolymer rubber, and ethylene-propylene-dicyclopentadiene copolymer rubber.

Examples of such EPMs include "JSR EP" manufactured by JSR Corporation, "Mitsui EPT" manufactured by Mitsui Chemicals, Inc, and Esprene manufactured by Sumitomo Chemical Co., Ltd.

When the polyolefin resin includes an ethylene-propylene random copolymer, the content of the ethylene-propylene random copolymer in the polyolefin resin is preferably 5 to 35% by mass, more preferably 10 to 30% by mass, and further preferably 15 to 25% by mass.

These ethylene-propylene random copolymers can be used alone or in combination of two or more.

The expandable composition used to produce the foam of the present invention may include additives such as a foaming agent, a crosslinking aid, an antioxidant, a foaming aid, a cell nucleus regulator, and a nucleating agent.

<Foaming Agent>

Examples of the method for foaming the expandable composition include chemical foaming methods and physical foaming methods. In a chemical foaming method, cells are formed by a gas produced by the thermal decomposition of a compound added to the expandable composition. In a physical foaming method, a low boiling point liquid (foaming agent) is impregnated into the expandable composition, and then the foaming agent is volatilized to form cells. The foaming method is not particularly limited, but a chemical foaming method is preferable. That is, the expandable composition used for the foam of the present invention preferably includes a foaming agent.

As the foaming agent, a thermally decomposable foaming agent can be suitably used. For example, an organic or inorganic chemical foaming agent having a decomposition temperature of about 140 to 270° C. can be used. Examples of the organic foaming agent include azo compounds such as azodicarbonamide, an azodicarboxylic metal salt (such as barium azodicarboxylate), and azobisisobutyronitrile, nitroso compounds such as N,N'-dinitrosopentamethylenetetramine, hydrazine derivatives such as hydrazodicarbonamide, 4,4'-oxybis(benzensulfonyl hydrazide), and toluenesulfonyl hydrazide, semicarbazide compounds such as toluenesulfonyl semicarbazide, and the like. Examples of the inorganic foaming agent include ammonium carbonate, sodium carbonate, ammonium bicarbonate, sodium bicarbonate, ammonium nitrite, sodium borohydride, monosodium citrate anhydride, and the like.

Among these, from the viewpoint of obtaining fine cells, and from an economic and safety point of view, azo compounds and nitroso compounds are preferable, azodicarbonamide, azobisisobutyronitrile, or N,N'-dinitrosopentamethylenetetramine is more preferable, and azodicarbonamide is particularly preferable. These foaming agents can be used alone or in combination of two or more.

From the viewpoint that a foam having the above-described reflection color difference can be easily obtained, the amount of the foaming agent added to the expandable composition is preferably 1 to 20 parts by mass with respect to 100 parts by mass of the polyolefin resin, more preferably 2 to 15 parts by mass, and further preferably 3 to 12 parts by mass.

The average particle size of the foaming agent is preferably 25 μm or less. When the average particle size of the foaming agent is 25 μm or less, there is less residue remaining in the foam after foaming agent is foamed, and a change in the color tone of the light that has passed through the foam can be suppressed while increasing the light transmittance of the foam. From this viewpoint, the average particle size of the foaming agent is more preferably 20 μm or less, further preferably 15 μm or less, still further preferably 10 μm or less, and particularly preferably 5 μm or less. By setting the average particle size to 5 μm or less, even when a polypropylene resin is included, the foaming property is good even if the foaming aid described later is not added. Note that the lower limit of the range of the average particle size of the foaming agent is, for example, 1 μm, although it is not particularly limited to this. The average particle size is the median diameter, and means the particle size (D50) at a cumulative volume of 50% in the particle size distribution of the foaming agent determined by a laser diffraction scattering method.

When a metal oxide is added as the foaming aid described later, even without having to set the average particle size of the foaming agent to 25 μm or less, a change in the color tone of the light that has passed through the foam can be suppressed while increasing the light transmittance of the foam. This is considered to be due to the fact that by adding the metal oxide, decomposition of the residue remaining in the foam after foaming by the foaming agent is promoted by the metal oxide and the amount of residue is reduced even if the average particle size of the foaming agent is larger than 25 μm. Specifically, the average particle size of the foaming agent may be about 30 μm or less.

<Crosslinking Aid>

The expandable composition used for the foam of the present invention may contain a crosslinking aid. The crosslinking aid is preferably used when the polyolefin resin includes a polypropylene resin. The content of the crosslinking aid in the expandable composition is preferably 2.0 to 5.0 parts by mass with respect to 100 parts by mass of the polyolefin resin. By setting the crosslinking aid to be 2.0 parts by mass or more with respect to 100 parts by mass of the polyolefin resin, the crosslinking of the expandable composition can be sufficiently promoted, and the cell diameter can be easily controlled. Since crosslinking of the kneaded mixture is more likely to occur in the extruder when the content of the crosslinking aid is high, by setting the crosslinking aid to be 5.0 parts by mass or less with respect to 100 parts by mass of the polyolefin resin, contaminants in the extruder due to the expandable composition adhering to the inside of the kneading machine can be suppressed, and foaming defects can be easily prevented. From this viewpoint, the content of the crosslinking aid in expandable composition is more preferably 2.5 to 4.7 parts by mass with respect to 100 parts by mass of the polyolefin resin.

Examples of the crosslinking aid include polyfunctional (meth)acrylate compounds, such as trifunctional (meth)acrylate compounds and bifunctional (meth)acrylate compounds, and compounds having three functional groups in one molecule. Other crosslinking aids include compounds having two functional groups in one molecule such as divinylbenzene, diallyl phthalate, diallyl terephthalate, diallyl isophthalate, ethylvinylbenzene, lauryl methacrylate, stearyl methacrylate, and the like.

Examples of the trifunctional (meth)acrylate compound include trimethylolpropane trimethacrylate, trimethylolpropane triacrylate, and the like. Examples of the bifunctional (meth)acrylate compound include 1,6-hexanediol dimethacrylate, 1,9-nonanediol dimethacrylate, 1,10-decanediol dimethacrylate, neopentylglycol dimethacrylate, and the like. Examples of the compound having three functional groups in one molecule include triallyl trimellitate, 1,2,4-triallyl benzenetricarboxylate, triallyl isocyanurate, and the like. These crosslinking aids can be used alone or in combination of two or more. Among these, from the viewpoint of promoting the crosslinking of the expandable composition, a polyfunctional (meth)acrylate compound is preferable, a bifunctional (meth)acrylate compound is more preferable, and 1,9-nonanediol dimethacrylate is further preferable.

<Antioxidant>

The expandable composition used for the foam of the present invention preferably contains an antioxidant. By containing an antioxidant, oxidative deterioration of the polyolefin resin can be suppressed. It is preferable to contain 0.1 to 5.0 parts by mass of the antioxidant with respect to 100 parts by mass of the polyolefin resin. By setting the content of the antioxidant to 0.1 parts by mass or more with respect to 100 parts by mass of the polyolefin resin, the oxidative deterioration of the polyolefin resin is further suppressed. Further, by setting the content of the antioxidant to 5.0 parts by mass or less with respect to 100 parts by mass of the polyolefin resin, a phenomenon in which excess antioxidant causes foam discoloration can be suppressed. From this viewpoint, it is more preferable to contain 0.2 to 3.0 parts by mass of the antioxidant with respect to 100 parts by mass of the polyolefin resin.

The type of antioxidant is not particularly limited, but examples thereof include phenolic antioxidants, sulfur antioxidants, phosphoric antioxidants, amine antioxidants, and the like. Among these, a phenolic antioxidant is preferable. Examples of the phenolic antioxidant include 2, 6-di-tert-butyl-p-cresol, n-octadecyl-3-(3,5-di-tert-butyl-4-hydroxyphenyl)propionate, 2-tert-butyl-6-(3-tert-butyl-2-hydroxy-5-methylbenzyl)-4-methylphenylacrylate, tetrakis[methylene-3-(3,3,5-di-tert-butyl-4-hydroxyphenyl) propionate]methane, and the like. Among these, tetrakis [methylene-3-(3,5-di-tert-butyl-4-hydroxyphenyl)] propionate]methane is preferable. One of these antioxidants may be used alone or two or more may be used in combination.

<Foaming Aid>

The expandable composition used for the foam of the present invention may include a foaming aid. When a foam of a polyolefin resin, in particular a polypropylene resin, is contained, the foaming property may not be good, but by containing the foaming aid shown below, the foaming property is good.

Examples of the foaming aid include a compound having a benzotrizole skeleton such as 3-(N-salicyloyl)amino-1,2,4-triazole, a compound having an oxamide skeleton such as [oxalylbis(azanediyl)]bis(ethane-2,1-diyl) bis[3-(3,5-di-tert-butyl-4-hydroxyphenyl)propanoate (for example, trade name "ANTAGE HP200", manufactured by Kawaguchi Chemical Co., Ltd.), a compound having a guanidine skeleton such as 1,3-diphenylguanidine, a compound having a hydrazine skeleton such as N,N'-bis[3-(3,5-di-tert-butyl-4-hydroxyphenyl)propionyl]hydrazine (product number: CDA-10, manufactured by ADEKA Corporation), a metal oxide such as magnesium oxide, titanium oxide, and zinc oxide, and the like. One of these foaming aides may be used alone or two or more may be used in combination.

Although the above-described compound having an oxamide skeleton has a phenol skeleton and also functions as an antioxidant, it also has a function of achieving good foaming property, and as used herein a phenolic compound having the above-described oxamide skeleton is a foaming aid. Moreover, the above-described compound having a guanidine skeleton is also generally used as a vulcanization accelerator or a heavy metal inactivator, but as used herein, such a compound is a foaming aid. As a metal oxide used as the foaming aid, magnesium oxide and titanium oxide are preferable, and magnesium oxide is more preferable.

When the foaming aid is magnesium oxide, the average particle size of the magnesium oxide is preferably 3 to 100 µm, more preferably 5 to 80 µm, and further preferably 5 to 20 µm. In addition, when the foaming aid is titanium oxide, the average particle size of the titanium oxide is preferably 0.05 to 1.0 µm, and more preferably 0.07 to 0.5 µm. The average particle size of the magnesium oxide and the titanium oxide is the median diameter, and means the particle size (D50) at a cumulative volume of 50% in the particle size distribution of the foaming agent determined by a laser diffraction scattering method.

The above-described foaming aid improves the foaming property, but can also be a factor in causing a deterioration in total light transmittance and reflection color difference. Therefore, when the above-described foaming aid is included, it is preferable to use only a small amount. Specifically, the content of the foaming aid is, with respect to 100 parts by mass of the polyolefin resin, for example, preferably less than 1 part by mass, more preferably 0.03 to 1.0 parts by mass, further preferably 0.04 to 0.9 parts by mass, still further preferably 0.05 to 0.8 parts by mass, even still further preferably 0.1 to 0.5 parts by mass, and particularly preferably 0.1 to 0.4 parts by mass. Of course, from the viewpoint of total light transmittance and reflection color difference, the foaming aid may not be blended. When the foaming aid contains the above-described metal oxide, the content of the metal oxide is, with respect to 100 parts by mass of the polyolefin resin, for example, preferably 0.1 to 1.0 parts by mass, more preferably 0.2 to 0.9 parts by mass, and further preferably 0.4 to 0.8 parts by mass.

<Cell Nucleus Regulator>

The expandable composition used for the foam of the present invention may contain a cell nucleus regulator. Examples of the cell nucleus regulator include a zinc compound such as zinc stearate, and an organic compound such as citric acid and urea. Among these, zinc oxide and zinc stearate are more preferable, and only one of these may be used, or both may be used. By using a cell nucleus regulator in addition to the foaming agent, it is easier to reduce the average cell diameter and variation in the cell diameter. The content of the cell nucleus regulator is, with respect to 100 parts by mass of the polyolefin resin, preferably 0.1 to 5 parts by mass, more preferably 0.2 to 2 parts by mass, and further preferably 0.3 to 1.5 parts by mass.

<Nucleating Agent>

The expandable composition used for the cross-linked polyolefin resin foam of the present invention may contain a nucleating agent. By containing a nucleating agent, it is possible to further improve the transparency of the foam. The content of the nucleating agent is, with respect to 100 parts by mass of the polyolefin resin, preferably 0.1 to 10 parts by mass, and more preferably 1 to 7 parts by mass.

The nucleating agent is not particularly limited as long as it has an effect of improving the rate of progression of the crystal nucleation process. By adding a nucleating agent to a polyolefin resin such as a polyethylene resin or a polypropylene resin, the size of the produced crystals can be reduced, and as a result the transparency of the foam can be improved.

Examples of nucleating agents that have an effect of improving the rate of progression of the crystal nucleation process include substances that have an effect of assisting molecular chain orientation through an adsorption process of the molecular chain of the polymer.

More specifically, examples may include a high melting point polymer, an organic carboxylic acid or a metal salt thereof, an aliphatic alcohol, dibenzylidene sorbitol or a derivative thereof, a partial metal salt of rosin acid, an amide compound, an inorganic fine particle, an organophosphate compound or a metal salt thereof, an imide, a quinacridone, a quinone, an aromatic sulfonate or a metal salt thereof, a sugar, and mixtures thereof. These may be used alone or in combination of two or more.

Examples of the high melting point polymer include a polyolefin such as poly 3-methylpentene-1 and poly 3-methylbutene-1, a polyvinylcycloalkane such as polyvinylcyclohexane and polyvinylcyclopentane, syndiotactic polystyrene, and a polyalkenylsilane.

Examples of the organic carboxylic acid and a metal salt thereof include benzoic acid, p-t-butyl benzoic acid, adipic acid, thiophenecarboxylic acid, pyrrolecarboxylic acid, aluminum benzoate, aluminum p-t-butylbenzoate, sodium adipate, sodium thiophenecarboxylate, and sodium pyrrolecarboxylate.

Examples of the dibenzylidene sorbitol and a derivative thereof include dibenzylidene sorbitol, 1,3:2,4-bis(o-3,4-dimethylbenzylidene)sorbitol, 1,3:2,4-bis(o-2,4-dimethylbenzylidene)sorbitol, 1,3:2,4-bis(o-4-ethylbenzylidene)sorbitol, 1,3:2,4-bis(o-4-chlorobenzylidene)sorbitol, 1,3:2,4-dibenzylidene sorbitol, etc. Commercially available products of the dibenzylidene sorbitol and a derivative thereof include Gelall MD and Gelall MD-R (trade names), manufactured by Shin Nippon Rika Co., Ltd.

Examples of the partial metal salt of rosin acid include Pine Crystal KM1600, Pine Crystal KM1500, Pine Crystal KM1300 (trade names), manufactured by Arakawa Chemical Industries, Ltd., and the like.

Examples of the amide compound include dianilide adipate and dianilide stearate.

Examples of the inorganic fine particle include talc, clay, mica, asbestos, glass fiber, glass flakes, glass beads, calcium silicate, montmorillonite, bentonite, graphite, aluminum powder, alumina, silica, diatomaceous earth, pumice powder, pumice balloon, aluminum hydroxide, magnesium hydroxide, basic magnesium carbonate, dolomite, calcium sulfate, potassium titanate, barium sulfate, calcium sulfite, molybdenum sulfide, and the like.

As the organophosphate metal salt, an organophosphate metal salt represented by the following general formula does not produce much odor, and is preferable.

[Formula 1]

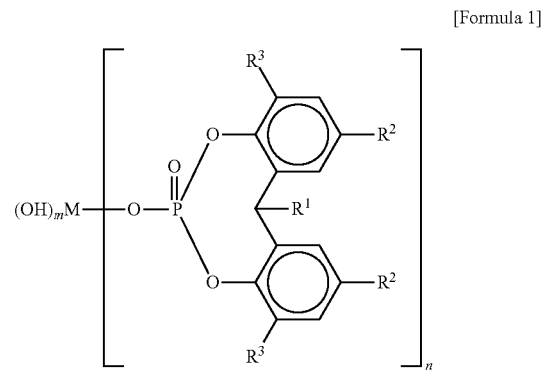

In the formula, $R^1$ represents a hydrogen atom or an alkyl group having 1 to 4 carbon atoms, and $R^2$ and $R^3$ each represent a hydrogen atom or an alkyl group, cycloalkyl group, aryl group or aralkyl group having 1 to 12 carbon atoms. M represents one species selected from the group consisting of an alkali metal, an alkaline earth metal, aluminum and zinc. When M is an alkali metal, m represents 0 and n represents 1. When M is an alkaline earth metal or zinc, n represents 1 or 2. When n is 1, m represents 1, and when n is 2, m represents 0. When M represents aluminum, m represents 1 and n represents 2.

Commercially available products of the organophosphate metal salt include ADK STAB NA-11 and ADK STAB NA-21 (ADEKA Corporation).

Among the nucleating agents, a sugar-based nucleating agent is preferable from the viewpoint of compatibility with the olefin and transparency. Examples of the sugar-based nucleating agent include a sorbitol, a nonitol, a xylitol, and the like, and it is more preferable to use one or more selected from these as a nucleating agent.

<Other Additives>

The expandable composition may optionally include additives commonly used for a foam, such as a heat stabilizer, a flame retardant, an antistatic agent, a filler, a corrosion inhibitor, a decomposition temperature adjuster, and the like.

[Method for Producing Cross-Linked Polyolefin Resin Foam]

The method for producing the foam of the present invention includes the following steps 1 to 3.
  Step 1: Step of producing an expandable sheet by processing an expandable composition containing a polyolefin resin into a sheet.
  Step 2: Step of producing a cross-linked expandable sheet by irradiating the expandable sheet with ionizing radiation.
  Step 3: Step of producing a cross-linked polyolefin resin foam by foaming the cross-linked expandable sheet.

(Step 1)

Step 1 is a step of producing an expandable sheet by processing an expandable composition containing a polyolefin resin into a sheet. A polyolefin resin expandable sheet can be produced by kneading the expandable composition using a kneading machine such as a Banbury mixer or a pressurized kneader, and then continuously extruding the kneaded mixture with an extruder, a calendar, conveyor belt casting, or the like.

(Step 2)

Step 2 is a step of producing a cross-linked expandable sheet by irradiating the expandable sheet with ionizing radiation. The irradiation dose when irradiating the ionizing radiation is, from the viewpoint of foaming of the foam, preferably 1.2 to 2.5 Mrad, more preferably 1.3 to 2.3 Mrad, and further preferably 1.4 to 2.1 Mrad. From the viewpoint of sufficiently crosslinking the foam, it is preferable to adjust the amount of the crosslinking aid in the expandable composition to the above range, and to set the irradiation conditions of the ionizing radiation to the above range. The irradiation of the ionizing radiation may be performed on one side of the expandable sheet or on both sides, but it is preferable to perform on both sides. Examples of the ionizing radiation include electron beams, $\alpha$-rays, $\beta$-rays, $\gamma$-rays, X-rays, and the like. Among these, electron beams are preferable from the viewpoint of productivity and uniformly performing irradiation.

As the crosslinking method, it is preferable to perform crosslinking by irradiating an expandable resin composition sheet with the ionizing radiation. However, the crosslinking may also be performed by adding an organic peroxide in advance and then heating the expandable resin composition sheet. Examples of the organic peroxide used for crosslinking include 1,1-bis(t-butylperoxy)3,3,5-trimethylcyclohexane, 1,1-bis(t-butylperoxy)cyclohexane, and the like. These may be used alone or in combination of two or more. The amount of organic peroxide added is, with respect to 100 parts by mass of the polyolefin resin, preferably 0.01 to 5 parts by mass, and more preferably 0.1 to 3 parts by mass. When the amount of organic peroxide added is within this range, crosslinking of the expandable sheet tends to progress, and the amount of a decomposition residue of the organic peroxide remaining in the expandable sheet is suppressed.

(Step 3)

Step 3 is a step of producing a sheet-like cross-linked polyolefin resin foam by foaming the cross-linked expandable sheet. Examples of the method of foaming the cross-linked expandable sheet include a batch method such as an oven and a continuous foaming method in which the cross-linked expandable sheet is continuously passed through a heating furnace. The temperature at which the cross-linked expandable sheet is foamed is preferably 160 to 280° C. By setting the temperature to 160° C. or higher, foaming can progress easily, and by setting the temperature to 280° C. or lower, it is possible to suppress the dissipation of gases from the foam. The temperature when foaming the cross-linked expandable sheet is more preferably 180 to 270° C., and further preferably 200 to 260° C. The method for adjusting to the above-described temperature is not particularly limited, but hot air may be used or infrared rays may be used. The cross-linked expandable sheet may be stretched in any one or both of the MD direction and the CD direction after the foaming or while being foamed. This enables a change in the color tone of the light that passes through the foam to be further suppressed.

[Pressure-Sensitive Adhesive Tape]

The pressure-sensitive adhesive tape of the present invention is a pressure-sensitive adhesive tape in which the above-described foam is used as a base material. Specifically, the pressure-sensitive adhesive tape of the present invention includes the foam of the present invention and a pressure-sensitive adhesive layer provided on at least one side of the foam of the present invention.

The pressure-sensitive adhesive tape of the present invention uses the foam according to the present invention as a base material, and provides a pressure-sensitive adhesive layer on one or both sides of the foam. The thickness of the pressure-sensitive adhesive tape is usually about 0.5 to 2.0 mm.

The thickness of the pressure-sensitive adhesive layer constituting the pressure-sensitive adhesive tape is preferably 50 to 200 μm, and more preferably 80 to 150 μm. When the thickness of the pressure-sensitive adhesive layer constituting the pressure-sensitive adhesive tape is 50 to 200 μm, the thickness of the pressure-sensitive adhesive tape can be thinner, and light transmittance is improved.

The pressure-sensitive adhesive layer is acceptable as long as it has at least a pressure-sensitive adhesive layer. The pressure-sensitive adhesive layer may be a single pressure-sensitive adhesive layer layered on at least one side of the foam, or may be a pressure-sensitive adhesive double coated sheet affixed to at least one side of the foam. However, the pressure-sensitive adhesive layer is preferably a single pressure-sensitive adhesive layer from the viewpoint of light transmittance and the like. The pressure-sensitive adhesive double coated sheet includes a base material and a pressure-sensitive adhesive layer provided on both sides of the base material. The pressure-sensitive adhesive double coated sheet uses one of the pressure-sensitive adhesive layers to adhere to a resin foam sheet and the other pressure-sensitive adhesive layer to adhere to another member.

The pressure-sensitive adhesive forming the pressure-sensitive adhesive layer is not particularly limited, and for example an acrylic pressure-sensitive adhesive, a urethane pressure-sensitive adhesive, a rubber pressure-sensitive sensitive adhesive, a silicone pressure-sensitive adhesive, and the like can be used. Further, a release sheet such as release paper may be bonded onto a pressure-sensitive adhesive material.

The pressure-sensitive adhesive tape using the foam of the present invention can be used as an impact absorbing material, a sealant, or the like arranged in the interior of the body of an electronic device. In addition, the foam may be bonded to the above-described surface material by the pressure-sensitive adhesive layer of the pressure-sensitive adhesive tape.

[Layered Product]

The layered product of the present invention includes the foam of the present invention and a transparent film layer provided on at least one side of the foam of the present invention. Examples of the film forming the transparent film layer include a polyethylene film, polypropylene film, a polystyrene film, a polyvinyl chloride film, a polyethylene terephthalate film, a polycarbonate film, an acrylic resin film, a polybutadiene film, and the like.

Further, another layered product of the present invention includes the foam of the present invention and at least one layer of a printed layer and a printed film provided on at least one side of the foam of the present invention. As a result, a shape corresponding to a printed pattern can be sensed from the front side by light. The printed layer can be formed, for example, by printing on at least one side of the foam. The printed film layer is a layer forming a printed layer on a base material film of a polyester film such as a polyolefin film or a PET film. The printed layer may be formed on only one side of the base material film, or may be formed on both sides. As the method for forming the printed layer, a known method such as an inkjet method can be appropriately used. The thickness of the printed layer is preferably 1 to 25 µm, and more preferably 2 to 10 µm. The thickness of the printed film layer is preferably 4 to 50 µm, and more preferably 12 to 25 µm.

The layered product of the present invention can be produced, for example, by layering a transparent film layer or a printed film on the foam or by forming the printed layer on the foam. The layering may be carried out using a heat lamination method, or the foam and the above-described layer may be adhered with an adhesive. The printed layer may be formed on only one side of the foam, or may be formed on both sides. Further, the transparent film or printed film may be layered on only one side of the foam, or may be layered on both sides.

[Formed Product]

The formed product of the present invention is obtained by forming the foam of the present invention. The formed product of the present invention is obtained by forming the foam of the present invention by a known method. When producing the formed product, the formed product can be produced by bonding another material such as a skin material to the foam. In addition, when producing the formed product, the foam and the base material can be integrally formed by injection molding. Further, the formed product of the present invention is preferably a product obtained by layering a skin material on a first side of the foam and layering the base material on a second side.

Examples of the skin material include polyurethane, a polyvinyl chloride sheet, a sheet made of a mixed resin of polyvinyl chloride and ABS resin, a thermoplastic elastomer sheet, a fabric using natural fibers or artificial fibers, a knitted product, a nonwoven fabric, leather such as artificial leather and synthetic leather, a metal, a decorative film, and the like. The decorative film is a film in which a printed layer is formed on the surface of a base material film of a polyester film such as a polyolefin film and a PET film. In the decorative film, the printed layer may be formed on the surface on the foam side of the base material film, the printed layer may be formed on the surface on the opposite side of the base material film, or the printed layer may be formed on both surfaces of the base material film. Further, a formed product having a design such as a skin or a wood pattern may be applied to the surface using real leather or a silicone stamper with irregularities transferred from stone, wood, or the like. By bonding a skin material to the foam and forming, a formed product can be obtained in which the skin material is layered on the foam. Examples of the method of bonding the skin material include extrusion lamination, adhesive lamination in which lamination is carried out after applying an adhesive, thermal lamination (heat fusion), a hot melt method, a high frequency welder method, and for metals and the like, electroless plating, electrolytic plating, vapor deposition, and the like, but the skin material and the foam may be bonded by any method. However, from the viewpoint that the skin material can be easily bonded to the formed foam, adhesive lamination method is preferable. The skin material may be formed directly on the surface of the foam, or the skin material may be formed on the surface of the foam with another layer arranged therebetween.

The base material acts as the backbone of the formed product, and a thermoplastic resin is usually used. As the thermoplastic resin for the base material, a copolymer with the above-described polyolefin resin, ethylene and an α-olefin, vinyl acetate, acrylic acid ester, and the like, ABS resin, and a polystyrene resin and the like can be applied. For example, the thermoplastic resin can be injection-molded onto the second surface of the foam to layer the base material on the foam.

Examples of the forming method of the formed product of the present invention include stamping, vacuum forming, compression molding, injection molding, and the like. Among these, stamping and vacuum forming are preferable. As the vacuum forming, vacuum forming over a male mold and vacuum forming in a female mold can both be adopted, but vacuum forming in a male mold is more preferable.

The foamed product obtained by forming the foam of the present invention has a soft tactile feel and can transmit light without changing the color tone of the light. From such characteristics, the formed product of the present invention can provide an automobile interior material having an excellent tactile feel and very good appearance by using the formed product as an automobile interior material.

[Display Member]

The foam of the present invention can be suitably used as a display member. That is, it is preferable to use a display member including the foam. Although the structure of the display member is not particularly limited, it is preferable to include a layered product and an information display component. For example, a display member can be obtained by layering a skin layer, the foam, and an information display component in that order. Examples of the information display component include a display, an arrayed LED, and the like. An arrayed LED is a device in which a plurality of LEDs are arranged in a specific shape in order to display specific information. Since the foam of the present invention can transmit light without changing the color tone of the light, the LED light can also be transmitted without the color tone being changed. For a light display member used in a vehicle, the use of blue LEDs has been studied, and the foam of the present invention can transmit blue LED light in particular without changing the color tone.

The display member may have a sensor element, and for example, the information display component may be a display having a sensor element such as a touch panel.

The display member is suitably used for vehicles such as automobiles, and displays necessary information such as temperature, time, vehicle speed, danger, safety, advance warning, and the like. The display member is preferably used as a member for design or lighting.

EXAMPLES

The present invention will be described in more detail by way of examples, but the present invention is not limited in any way by these examples.

Example 1

An expandable composition was produced by mixing 85 parts by mass of polypropylene resin (1), 15 parts by mass of polyethylene resin (1), 5.6 parts by mass of foaming agent (3), 3 parts by mass of a crosslinking aid, 0.5 parts by mass of a phenolic antioxidant, and 0.3 parts by mass of foaming aid (3). The obtained expandable composition was melt-kneaded at a temperature of 180° C. by a single screw extruder to produce an expandable sheet. Both sides of the expandable sheet were irradiated with 2.0 Mrad of ionizing radiation (electron beam) at an acceleration voltage of 1000 keV to obtain a cross-linked expandable sheet. Then, the cross-linked expandable sheet was placed in a vertical hot air foaming furnace having a furnace temperature of 250° C., and heated and foamed while stretching to obtain the desired foam.

The thickness, expansion ratio, total light transmittance, reflection color difference, and 25% compressive stress of the foam were evaluated as follows. The results are shown in Table 1.

The details of each raw material used in Examples 1, Examples 2 to 13, and Comparative Examples 1 to 6 described later are as follows.

Polypropylene resin (1): Ethylene-propylene random copolymer (r-PP), trade name "AD571", manufactured by Sumitomo Chemical Co., Ltd., density 0.90 g/cm$^3$, MFR 0.5 g/10 min (230° C.)

Polypropylene resin (2): Ethylene-propylene random copolymer (m-r-PP) produced using a metallocene catalyst, trade name "Wintech WF, X4TA", manufactured by Japan Polypropylene Corporation, density 0.9 g/cm$^3$, MFR 7.0 g/10 min (230° C.)

Polyethylene resin (1): Linear low-density polyethylene (LLDPE) produced by high-pressure polymerization, trade name "Nipolon-Z, ZF231", manufactured by Tosoh Corporation, density 0.917 g/cm$^3$, MFR 2.0 g/10 min (190° C.)

Polyethylene resin (2): Low-density polyethylene (LDPE), trade name "Ube Polyethylene, F522N", manufactured by Ube-Maruzen Polyethylene Co., Ltd., density 0.922 g/cm$^3$, MFR 5.0 g/10 min (190° C.)

Polyethylene resin (3): Linear low-density polyethylene (m-LLDPE) produced using a metallocene catalyst, trade name "Exact 3027", manufactured by Exxon Chemicals, density 0.900 g/cm$^3$, MFR 3.5 g/10 min (190° C.)

Ethylene-vinyl acetate copolymer (EVA): Trade name "Ultrasen, 636", manufactured by Tosoh Corporation, vinyl acetate content 19%, density 0.941 g/cm$^3$, MFR 2.5 g/10 min (190° C.)

Ethylene-propylene random copolymer: Ethylene-propylene copolymer rubber (EPM), trade name "JSR EP11", manufactured by JSR Corporation, ethylene content: 52%

Foaming agent (1): Azodicarbonamide, trade name "Vinifor AC #R", manufactured by Eiwa Chemical Ind. Co., Ltd., decomposition temperature: 205° C., median diameter: 30 μm Foaming agent (2): Azodicarbonamide, trade name "Vinifor AC-K3-TA", manufactured by Eiwa Chemical Ind. Co., Ltd., decomposition temperature: 208° C., median diameter: 25 μm Foaming agent (3): Azodicarbonamide, trade name "32451", manufactured by Ohtsuka Chemical Co., Ltd., median diameter: 23 μm Foaming agent (4): Azodicarbonamide, trade name "SO-G31ST", manufactured by Ohtsuka Chemical Co., Ltd., median diameter: 11.2 μm Foaming agent (5): Azodicarbonamide, trade name "10351", manufactured by Ohtsuka Chemical Co., Ltd., median diameter: 3.2 μm Crosslinking aid: 1,9-Nonanediol dimethacrylate, trade name "Light Ester 1,9ND", manufactured by Kyoeisha Chemical Co., Ltd., viscosity 8 mPa·s/25° C.

Phenolic antioxidant: Tetrakis[methylene-3-(3,3,5-di-tert-butyl-4-hydroxyphenyl)propionate]methane, trade name "Irganox 1010", manufactured by BASF Japan Ltd.

Cell nucleus regulator (1): Zinc oxide, trade name "Zinc Oxide Type 2", manufactured by Sakai Chemical Industry Co., Ltd.

Cell nucleus regulator (2): Zinc stearate, trade name "SZ-2000", manufactured by Sakai Chemical Industry Co., Ltd.

Nucleating agent: Trade name "NAT-95", manufactured by Tokyo Printing Ink Mfg. Co., Ltd.

Foaming aid (1): 3-(N-salicyloyl)amino-1,2,4-triazole, trade name "ADK STAB CDA-1", manufactured by ADEKA Corporation Foaming aid (2): [oxalylbis(azanediyl)]bis(ethane-2,1-diyl) bis[3-(3,5-di-tert-butyl-4-hydroxyphenyl)propanoate, trade name "Antioxidant MD-697", manufactured by Tokyo Chemical Industry Co., Ltd.

Foaming aid (3): 1,3-diphenylguanidine, trade name "Noxeller D", manufactured by Ouchi Chemical Industrial Co., Ltd.

Foaming aid (4): bis(ethane-2,1-diyl) bis[3-(3,5-di-tert-butyl-4-hydroxyphenyl)propanoate, trade name "ANTAGE HP200", manufactured by Kawaguchi Chemical Co., Ltd.

Foaming aid (5): Magnesium oxide, trade name "RF-10C-SC", manufactured by Ube Materials Industries Ltd., average particle size 10 μm Foaming aid (6): Magnesium oxide, trade name "RF-50C-SC", manufactured by Ube Materials Industries Ltd., average particle size 50 μm Foaming aid (7): Magnesium oxide, trade name "RF-70C-SC", manufactured by Ube Materials Industries Ltd., average particle size 70 μm Foaming aid (8): Magnesium oxide, trade name "Pyrokisuma 3320", manufactured by Kyowa Chemical Industry Co., Ltd., average particle size 20 μm Foaming aid (9): Anatase-type titanium oxide, trade name "TITONE SA-1", manufactured by Sakai Chemical Industry Co., Ltd., average particle size 15 μm Examples 2 to 21 and Comparative Examples 1 to 6

The foams of Examples 2 to 12 and 14 to 21, and the foams of Comparative Examples 1 to 3, were obtained in the same way as Example 1, except that the compositional makeup of the expandable compositions was changed as shown in Tables 1 to 4. Further, the foams of Example 13 and Comparative Example 4 were obtained in the same way as Example 1, except that the formulation of the expandable compositions was changed as shown in Tables 1 to 3 and temperature during the melt-kneading of the expandable compositions was changed from 180° C. to 130° C.

(Foam Thickness)

The thickness of the foams of the examples and comparative examples was measured in accordance with JIS K6767.

(Foam Expansion Ratio)

The expansion ratio was calculated by dividing the density of the expandable sheet before foaming by the density (apparent density) of foam after foaming.

(Foam Total Light Transmittance)

The total light transmittance of the foams was measured using a haze meter in accordance with ASTM D1003 on the foams adjusted to the thickness shown in Table 1. Further, based on the following equation (2), the calculation value of the total light transmittance of the foams was calculated. The calculation value of the total light transmittance of the foams indicates the lower limit of the total light transmittance of the foams satisfying equation (1). Therefore, this means that if the value of (y-z) is negative, the total light transmittance of the foam does not satisfy equation (1), and the higher the value of (y-z), the better the total light transmittance of the foam.

$$z = 29.631 \times x^{0.352} \quad (2)$$

(Foam Reflection Color Difference)

Using a spectrophotometer (model number: CM-3600A, manufactured by Konica Minolta Inc.), the reflection color differences $\Delta b^*$, $\Delta a^*$, and $\Delta L^*$ were measured in accordance with JIS Z8722.

(Foam 25% Compressive Strength)

The 25% compressive strength of the foams was measured using a measurement method in accordance with JIS K6767.

The evaluation results of the foam thickness, expansion ratio, total light transmittance, reflection color difference, and 25% compressive strength of the foams are shown in Tables 1 to 4.

TABLE 1

| | | Material | Type | Unit | Example 1 | Example 2 | Example 3 | Example 4 |
|---|---|---|---|---|---|---|---|---|
| Blend | Resin component | Polypropylene resin (1) | r-PP | parts by mass | 85 | 80 | 80 | 60 |
| | | Polypropylene resin (2) | m-r-PP | parts by mass | | | | |
| | | Polyethylene resin (1) | LLDPE | parts by mass | 15 | 20 | 15 | 40 |
| | | Polyethylene resin (2) | LDPE | parts by mass | | | | |
| | | Polyethylene resin (3) | m-LLDPE | parts by mass | | | | |
| | | Ethylene-vinyl acetate copolymer | EVA | parts by mass | | | 5 | |
| | | Ethylene-propylene random copolymer | EPM | parts by mass | | | | |
| | Additive | Foaming agent (1) | Median diameter: 30 μm | parts by mass | | | | |
| | | Foaming agent (2) | Median diameter: 25 μm | parts by mass | | | | |
| | | Foaming agent (3) | Median diameter: 23 μm | parts by mass | 5.6 | 8.3 | 5.6 | |
| | | Foaming agent (4) | Median diameter: 11.2 μm | parts by mass | | | | |
| | | Foaming agent (5) | Median diameter: 3.2 μm | parts by mass | | | | 10 |
| | | Crosslinking aid | — | parts by mass | 3 | 3 | 3 | 3 |
| | | Phenolic antioxidant | — | parts by mass | 0.5 | 0.5 | 0.5 | 0.5 |
| | | Cell nucleus regulator (1) | — | parts by mass | | | | |
| | | Cell nucleus regulator (2) | — | parts by mass | | | | |
| | | Nucleating agent | — | parts by mass | | | | |
| | | Foaming aid (1) | — | parts by mass | | 0.3 | 0.3 | 0.3 |
| | | Foaming aid (2) | — | parts by mass | | | | |
| | | Foaming aid (3) | — | parts by mass | 0.3 | | | |
| Foam Sheet | Foam thickness | | | mm | 0.6 | 1.0 | 1.0 | 1.5 |
| | Foam expansion ratio | | | times | 17 | 20 | 13 | 30 |
| | Foam total light transmittance | | Measurement value | % | 45 | 30 | 31 | 35 |
| | | | Calculation value | % | 35 | 30 | 30 | 26 |
| | | | Measurement value − calculation value | % | 10 | 0 | 1 | 9 |
| | Reflection color difference | | $\Delta L^*$ | — | | 79.1 | 81.6 | 79.1 | 81.5 |
| | | | $\Delta a^*$ | — | | −0.04 | 0.49 | 0.06 | 0.56 |
| | | | $\Delta b^*$ | — | | 8.04 | 9.23 | 7.94 | 9.24 |
| | 25% compressive strength | | | kPa | 121 | 112 | 103 | 77 |

| | | Material | Type | Unit | Example 5 | Example 6 | Example 7 |
|---|---|---|---|---|---|---|---|
| | Blend Resin component | Polypropylene resin (1) | r-PP | parts by mass | 80 | 80 | |
| | | Polypropylene resin (2) | m-r-PP | parts by mass | | | 80 |
| | | Polyethylene resin (1) | LLDPE | parts by mass | 20 | 20 | 20 |
| | | Polyethylene resin (2) | LDPE | parts by mass | | | |

TABLE 1-continued

| | | Material | Type | Unit | | | |
|---|---|---|---|---|---|---|---|
| | | Polyethylene resin (3) | m-LLDPE | parts by mass | | | |
| | | Ethylene-vinyl acetate copolymer | EVA | parts by mass | | | |
| | | Ethylene-propylene random copolymer | EPM | parts by mass | | | |
| | Additive | Foaming agent (1) | Median diameter: 30 μm | parts by mass | | | |
| | | Foaming agent (2) | Median diameter: 25 μm | parts by mass | | | |
| | | Foaming agent (3) | Median diameter: 23 μm | parts by mass | 10 | | |
| | | Foaming agent (4) | Median diameter: 11.2 μm | parts by mass | | | 5 |
| | | Foaming agent (5) | Median diameter: 3.2 μm | parts by mass | | 8 | |
| | | Crosslinking aid | — | parts by mass | 3 | 3 | 3 |
| | | Phenolic antioxidant | — | parts by mass | 0.5 | 0.5 | 0.5 |
| | | Cell nucleus regulator (1) | — | parts by mass | | | |
| | | Cell nucleus regulator (2) | — | parts by mass | | | |
| | | Nucleating agent | — | parts by mass | 5 | | |
| | | Foaming aid (1) | — | parts by mass | 0.5 | | |
| | | Foaming aid (2) | — | parts by mass | | | |
| | | Foaming aid (3) | — | parts by mass | | | |
| Foam Sheet | Foam thickness | | | mm | 3.0 | 1.0 | 0.4 |
| | Foam expansion ratio | | | times | 25 | 25 | 8 |
| | Foam total light transmittance | | Measurement value | % | 28 | 31 | 45 |
| | | | Calculation value | % | 20 | 30 | 41 |
| | | | Measurement value − calculation value | % | 8 | 1 | 4 |
| | Reflection color difference | | ΔL* | — | 79.7 | 81.1 | 77.2 |
| | | | Δa* | — | 1.63 | 1.09 | 0.28 |
| | | | Δb* | — | 13.85 | 9.52 | 6.04 |
| | 25% compressive strength | | | kPa | 89 | 96 | 97 |

TABLE 2

| | | Material | Type | Unit | Example 8 | Example 9 | Example 10 | Example 11 |
|---|---|---|---|---|---|---|---|---|
| Blend | Resin component | Polypropylene resin (1) | r-PP | parts by mass | | 80 | 80 | 80 |
| | | Polypropylene resin (2) | m-r-PP | parts by mass | 100 | | | |
| | | Polyethylene resin (1) | LLDPE | parts by mass | | 20 | | |
| | | Polyethylene resin (2) | LDPE | parts by mass | | | | |
| | | Polyethylene resin (3) | m-LLDPE | parts by mass | | | 20 | 20 |
| | | Ethylene-vinyl acetate copolymer | EVA | parts by mass | | | | |
| | | Ethylene-propylene random copolymer | EPM | parts by mass | | | | |
| | Additive | Foaming agent (1) | Median diameter: 30 μm | parts by mass | | | | |
| | | Foaming agent (2) | Median diameter: 25 μm | parts by mass | | | | |
| | | Foaming agent (3) | Median diameter: 23 μm | parts by mass | 5 | 8 | | |
| | | Foaming agent (4) | Median diameter: 11.2 μm | parts by mass | | | | |
| | | Foaming agent (5) | Median diameter: 3.2 μm | parts by mass | | | 10 | 10 |
| | | Crosslinking aid | — | parts by mass | 3 | 3 | 3 | 3 |
| | | Phenolic antioxidant | — | parts by mass | 0.5 | 0.5 | 0.5 | 0.5 |
| | | Cell nucleus regulator (1) | — | parts by mass | | | 0.5 | |
| | | Cell nucleus regulator (2) | — | parts by mass | | | | |
| | | Nucleating agent | — | parts by mass | | | | |
| | | Foaming aid (1) | — | parts by mass | | | | |
| | | Foaming aid (2) | — | parts by mass | | | | 0.3 |
| | | Foaming aid (3) | — | parts by mass | | 0.3 | | |
| Foam Sheet | Foam thickness | | | mm | 0.3 | 2.0 | 2.2 | 2.0 |
| | Foam expansion ratio | | | times | 8 | 25 | 20 | 20 |
| | Foam total light transmittance | | Measurement value | % | 48 | 33 | 49 | 40 |
| | | | Calculation value | % | 45 | 23 | 22 | 23 |
| | | | Measurement value − calculation value | % | 3 | 10 | 27 | 17 |
| | Reflection color difference | | ΔL* | — | 75.4 | 82.5 | 76.4 | 81.8 |
| | | | Δa* | — | −0.02 | −1.09 | −1.18 | −2.12 |
| | | | Δb* | — | 3.51 | 12.55 | 7.74 | 10.9 |
| | 25% compressive strength | | | kPa | 102 | 94 | 102 | 100 |

| | | Material | Type | Unit | Example 12 | Example 13 |
|---|---|---|---|---|---|---|
| | Blend Resin component | Polypropylene resin (1) | r-PP | parts by mass | 50 | |
| | | Polypropylene resin (2) | m-r-PP | parts by mass | | |
| | | Polyethylene resin (1) | LLDPE | parts by mass | 30 | |
| | | Polyethylene resin (2) | LDPE | parts by mass | | 100 |
| | | Polyethylene resin (3) | m-LLDPE | parts by mass | | |

TABLE 2-continued

|  |  | Material | Type | Unit |  |  |
|---|---|---|---|---|---|---|
|  |  | Ethylene-vinyl acetate copolymer | EVA | parts by mass |  |  |
|  |  | Ethylene-propylene random copolymer | EPM | parts by mass |  | 20 |
|  | Additive | Foaming agent (1) | Median diameter: 30 μm | parts by mass |  |  |
|  |  | Foaming agent (2) | Median diameter: 25 μm | parts by mass |  |  |
|  |  | Foaming agent (3) | Median diameter: 23 μm | parts by mass | 10 |  |
|  |  | Foaming agent (4) | Median diameter: 11.2 μm | parts by mass |  | 15 |
|  |  | Foaming agent (5) | Median diameter: 3.2 μm | parts by mass |  |  |
|  |  | Crosslinking aid | — | parts by mass | 3 |  |
|  |  | Phenolic antioxidant | — | parts by mass | 0.5 | 0.5 |
|  |  | Cell nucleus regulator (1) | — | parts by mass |  | 1 |
|  |  | Cell nucleus regulator (2) | — | parts by mass |  | 0.2 |
|  |  | Nucleating agent | — | parts by mass |  |  |
|  |  | Foaming aid (1) | — | parts by mass |  |  |
|  |  | Foaming aid (2) | — | parts by mass | 0.3 |  |
|  |  | Foaming aid (3) | — | parts by mass |  |  |
| Foam Sheet | Foam thickness |  |  | mm | 3.5 | 1.8 |
|  | Foam expansion ratio |  |  | times | 20 | 25 |
|  | Foam total light transmittance |  | Measurement value | % | 20 | 47 |
|  |  |  | Calculation value | % | 19 | 24 |
|  |  |  | Measurement value − calculation value | % | 1 | 23 |
|  | Reflection color difference |  | ΔL* | — | 90.7 | 59.4 |
|  |  |  | Δa* | — | −1.44 | −0.24 |
|  |  |  | Δb* | — | 9.3 | 0.33 |
|  | 25% compressive strength |  |  | kPa | 69 | 41 |

TABLE 3

|  |  | Material | Type | Unit | Example 14 | Example 15 | Example 16 | Example 17 |
|---|---|---|---|---|---|---|---|---|
| Blend | Resin component | Polypropylene resin (1) | r-PP | parts by mass | 80 | 80 | 80 | 80 |
|  |  | Polypropylene resin (2) | m-r-PP | parts by mass |  |  |  |  |
|  |  | Polyethylene resin (1) | LLDPE | parts by mass | 20 | 20 | 20 | 20 |
|  |  | Polyethylene resin (2) | LDPE | parts by mass |  |  |  |  |
|  |  | Polyethylene resin (3) | m-LLDPE | parts by mass |  |  |  |  |
|  |  | Ethylene-vinyl acetate copolymer | EVA | parts by mass |  |  |  |  |
|  |  | Ethylene-propylene random copolymer | EPM | parts by mass |  |  |  |  |
|  | Additive | Foaming agent (1) | Median diameter: 30 μm | parts by mass | 12 |  | 8 |  |
|  |  | Foaming agent (2) | Median diameter: 25 μm | parts by mass |  |  |  |  |
|  |  | Foaming agent (3) | Median diameter: 23 μm | parts by mass |  |  |  |  |
|  |  | Foaming agent (4) | Median diameter: 11.2 μm | parts by mass |  |  |  |  |
|  |  | Foaming agent (5) | Median diameter: 3.2 μm | parts by mass |  | 8 |  | 8 |
|  |  | Crosslinking aid | — | parts by mass |  |  |  |  |
|  |  | Phenolic antioxidant | — | parts by mass |  |  |  |  |
|  |  | Cell nucleus regulator (1) | — | parts by mass |  |  |  |  |
|  |  | Cell nucleus regulator (2) | — | parts by mass |  |  |  |  |
|  |  | Nucleating agent | — | parts by mass |  |  |  |  |
|  |  | Foaming aid (4) | — | parts by mass | 0.8 | 0.8 |  |  |
|  |  | Foaming aid (5) | Average particle size: 10 μm | parts by mass |  |  | 0.7 | 0.7 |
|  |  | Foaming aid (6) | Average particle size: 50 μm | parts by mass |  |  |  |  |
|  |  | Foaming aid (7) | Average particle size: 70 μm | parts by mass |  |  |  |  |
|  |  | Foaming aid (8) | Average particle size: 20 μm | parts by mass |  |  |  |  |
|  |  | Foaming aid (9) | Average particle size: 0.15 μm | parts by mass |  |  |  |  |
| Foam Sheet | Foam thickness |  |  | mm | 2.0 | 2.0 | 1.5 | 2.0 |
|  | Foam expansion ratio |  |  | times | 20 | 20 | 20 | 25 |
|  | Foam total light transmittance |  | Measurement value | % | 34 | 39 | 46 | 40 |
|  |  |  | Calculation value | % | 23 | 23 | 26 | 23 |
|  |  |  | Measurement value − calculation value | % | 11 | 16 | 20 | 17 |
|  | Reflection color difference |  | ΔL* | — | 82.4 | 83.8 | 79.0 | 84.6 |
|  |  |  | Δa* | — | −1.87 | −1.67 | −1.9 | −1.56 |
|  |  |  | Δb* | — | 11.66 | 10.63 | 9.68 | 8 |
|  | 25% compressive strength |  |  | kPa | 115 | 103 | 119 | 73 |

|  |  | Material | Type | Unit | Example 18 | Example 19 | Example 20 | Example 21 |
|---|---|---|---|---|---|---|---|---|
| Blend | Resin component | Polypropylene resin (1) | r-PP | parts by mass | 80 | 80 | 80 | 80 |
|  |  | Polypropylene resin (2) | m-r-PP | parts by mass |  |  |  |  |
|  |  | Polyethylene resin (1) | LLDPE | parts by mass | 20 | 20 | 20 | 20 |

TABLE 3-continued

| | Material | Type | Unit | | | | |
|---|---|---|---|---|---|---|---|
| | Polyethylene resin (2) | LDPE | parts by mass | | | | |
| | Polyethylene resin (3) | m-LLDPE | parts by mass | | | | |
| | Ethylene-vinyl acetate copolymer | EVA | parts by mass | | | | |
| | Ethylene-propylene random copolymer | EPM | parts by mass | | | | |
| Additive | Foaming agent (1) | Median diameter: 30 μm | parts by mass | | | | |
| | Foaming agent (2) | Median diameter: 25 μm | parts by mass | | | | |
| | Foaming agent (3) | Median diameter: 23 μm | parts by mass | | | | |
| | Foaming agent (4) | Median diameter: 11.2 μm | parts by mass | | | | |
| | Foaming agent (5) | Median diameter: 3.2 μm | parts by mass | 8 | 8 | 8 | 8 |
| | Crosslinking aid | — | parts by mass | | | | |
| | Phenolic antioxidant | — | parts by mass | | | | |
| | Cell nucleus regulator (1) | — | parts by mass | | | | |
| | Cell nucleus regulator (2) | — | parts by mass | | | | |
| | Nucleating agent | — | parts by mass | | | | |
| | Foaming aid (4) | — | parts by mass | | | | |
| | Foaming aid (5) | Average particle size: 10 μm | parts by mass | | | | 0.7 |
| | Foaming aid (6) | Average particle size: 50 μm | parts by mass | 0.7 | | | |
| | Foaming aid (7) | Average particle size: 70 μm | parts by mass | | 0.8 | | |
| | Foaming aid (8) | Average particle size: 20 μm | parts by mass | | | 0.8 | |
| | Foaming aid (9) | Average particle size: 0.15 μm | parts by mass | | | | 0.1 |
| Foam Sheet | Foam thickness | | mm | 2.0 | 2.0 | 2.0 | 2.0 |
| | Foam expansion ratio | | times | 25 | 19 | 18 | 20 |
| | Foam total light transmittance | Measurement value | % | 43 | 38 | 36 | 32 |
| | | Calculation value | % | 23 | 23 | 23 | 23 |
| | | Measurement value − calculation value | % | 20 | 15 | 13 | 9 |
| | Reflection color difference | ΔL* | — | 84.5 | 81.3 | 78.5 | 88.5 |
| | | Δa* | — | −1.6 | −1.78 | 1.8 | 1.8 |
| | | Δb* | — | 8.21 | 9 | 15.3 | 5.3 |
| | 25% compressive strength | | kPa | 75 | 121 | 124 | 115 |

TABLE 4

| | | Material | Type | Unit | Comparative Example 1 | Comparative Example 2 | Comparative Example 3 |
|---|---|---|---|---|---|---|---|
| Blend component | Resin | Polypropylene resin (1) | r-PP | parts by mass | 80 | 80 | 80 |
| | | Polypropylene resin (2) | m-r-PP | parts by mass | | | |
| | | Polyethylene resin (1) | LLDPE | parts by mass | 20 | 10 | 20 |
| | | Polyethylene resin (2) | LDPE | parts by mass | | | |
| | | Polyethylene resin (3) | m-LLDPE | parts by mass | | | |
| | | Ethylene-vinyl acetate copolymer | EVA | parts by mass | | 10 | |
| | | Ethylene-propylene random copolymer | EPM | parts by mass | | | |
| | Additive | Foaming agent (1) | Median diameter: 30 μm | parts by mass | 8 | 5 | 10 |
| | | Foaming agent (2) | Median diameter: 25 μm | parts by mass | | | |
| | | Foaming agent (3) | Median diameter: 23 μm | parts by mass | | | |
| | | Foaming agent (4) | Median diameter: 11.2 μm | parts by mass | | | |
| | | Foaming agent (5) | Median diameter: 3.2 μm | parts by mass | | | |
| | | Crosslinking aid | — | parts by mass | 3 | 3 | 3 |
| | | Phenolic antioxidant | — | parts by mass | 0.5 | 0.5 | 0.5 |
| | | Cell nucleus regulator (1) | — | parts by mass | | | |
| | | Cell nucleus regulator (2) | — | parts by mass | | | |
| | | Nucleating agent | — | parts by mass | | | |
| | | Foaming aid (1) | — | parts by mass | 0.6 | | |
| | | Foaming aid (2) | — | parts by mass | | | 0.5 |
| | | Foaming aid (3) | — | parts by mass | | 0.3 | |
| Foam Sheet | | Foam thickness | | mm | 2.8 | 1.8 | 3.6 |
| | | Foam expansion ratio | | times | 14 | 13 | 20 |
| | | Foam total light transmittance | Measurement value | % | 25 | 30 | 32 |
| | | | Calculation value | % | 21 | 24 | 19 |
| | | | Measurement value − calculation value | % | 4 | 6 | 3 |
| | | Reflection color difference | ΔL* | — | 45.1 | 56.4 | 64.3 |
| | | | Δa* | — | 9.57 | 5.23 | −1.49 |
| | | | Δb* | — | 29.35 | 26.06 | 22.99 |
| | | 25% compressive strength | | kPa | 63 | 110 | 72 |

TABLE 4-continued

| | Material | Type | Unit | Comparative Example 4 | Comparative Example 5 | Comparative Example 6 |
|---|---|---|---|---|---|---|
| Blend Resin component | Polypropylene resin (1) | r-PP | parts by mass | | | |
| | Polypropylene resin (2) | m-r-PP | parts by mass | | | |
| | Polyethylene resin (1) | LLDPE | parts by mass | | | 100 |
| | Polyethylene resin (2) | LDPE | parts by mass | 100 | 100 | |
| | Polyethylene resin (3) | m-LLDPE | parts by mass | | | |
| | Ethylene-vinyl acetate copolymer | EVA | parts by mass | | | |
| | Ethylene-propylene random copolymer | EPM | parts by mass | | | |
| Additive | Foaming agent (1) | Median diameter: 30 μm | parts by mass | 20 | 15 | |
| | Foaming agent (2) | Median diameter: 25 μm | parts by mass | | | |
| | Foaming agent (3) | Median diameter: 23 μm | parts by mass | | | |
| | Foaming agent (4) | Median diameter: 11.2 μm | parts by mass | | | 15 |
| | Foaming agent (5) | Median diameter: 3.2 μm | parts by mass | | | |
| | Crosslinking aid | — | parts by mass | | | |
| | Phenolic antioxidant | — | parts by mass | 0.5 | 0.5 | 0.5 |
| | Cell nucleus regulator (1) | — | parts by mass | 1 | 1 | |
| | Cell nucleus regulator (2) | — | parts by mass | 0.2 | 0.2 | |
| | Nucleating agent | — | parts by mass | | | |
| | Foaming aid (1) | — | parts by mass | | | 1.1 |
| | Foaming aid (2) | — | parts by mass | | | |
| | Foaming aid (3) | — | parts by mass | | | |
| Foam Sheet | Foam thickness | | mm | 1.7 | 2.1 | 2.0 |
| | Foam expansion ratio | | times | 24 | 23 | 35 |
| | Foam total light transmittance | Measurement value | % | 30 | 17 | 11 |
| | | Calculation value | % | 25 | 23 | 23 |
| | | Measurement value − calculation value | % | 5 | −6 | −12 |
| | Reflection color difference | ΔL* | | — | 52.6 | 46.9 | 79.0 |
| | | Δa* | | — | −.82 | −0.77 | 5.3 |
| | | Δb* | | — | 16.73 | 15.42 | 18.00 |
| | 25% compressive strength | | kPa | 40 | 37 | 36 |

From the results of the above-described examples, it was found that the foams of Examples 1 to 13 suppressed a change in the color tone of transmitted light while ensuring transparency. This was found to be due to the average particle size of the foaming agent being less than 25 μm. Examples 14 to 21 suppressed a change in the color tone of the transmitted light while ensuring transparency regardless of the average particle size of the foaming agent. From this, it was found that by using magnesium oxide as a foaming aid, it is possible to suppress a change in the color tone of transmitted light while ensuring transparency regardless of the average particle size of the foaming agent. In addition, it was found that the foams of Examples 1 to 21 also had good mechanical properties and flexibility. On the other hand, it was found that the color tone of transmitted light changed greatly in the foams of Comparative Examples 1 to 4. Moreover, it was found that the foam of Comparative Example 5 had poor light transmittance. Furthermore, it was found that the color tone of transmitted light greatly changed in the foam of Comparative Example 6, and the light transmittance was also poor. This was found to be because the average particle size of the foaming agent was greater than 25 μm, or because the content of foaming aid was higher than 1.0 parts by mass with respect to 100 parts by mass of the polyolefin resin.

The invention claimed is:

1. A cross-linked polyolefin resin foam, satisfying the following equation (1), when a total light transmittance measured with a haze meter in accordance with ASTM D1003 is taken to be y % and a thickness is taken to be x mm:

$$y \geq 29.631 \times x^{-0.352} \quad (1)$$

and having a reflection color difference Δb" of −10 to 16, a reflection color difference Δa" of −3 to 3, and a reflection color difference ΔL" of 50 or more, wherein the reflection color differences Δb*, Δa*, and ΔL* are measured in accordance with JIS Z8722.

2. The cross-linked polyolefin resin foam according to claim 1, wherein the thickness is 0.1 to 10 mm.

3. The cross-linked polyolefin resin foam according to claim 1, wherein
the cross-linked polyolefin resin foam is obtained by foaming an expandable composition comprising a polyolefin resin and a foaming agent, and
the foaming agent has an average particle size of 25 μm or less.

4. The cross-linked polyolefin resin foam according to claim 1, wherein
the cross-linked polyolefin resin foam is obtained by foaming an expandable composition comprising a polyolefin resin, a foaming agent, and a foaming aid, and
the foaming aid comprises a metal oxide.

5. The cross-linked polyolefin resin foam according to claim 3, wherein the polyolefin resin comprises at least one of a polypropylene resin and a polyethylene resin.

6. The cross-linked polyolefin resin foam according to claim 3, wherein the polyolefin resin further comprises at least one of an ethylene-vinyl acetate copolymer and an ethylene-propylene random copolymer.

7. A pressure-sensitive adhesive tape comprising:
the cross-linked polyolefin resin foam according to claim 1; and
a pressure-sensitive adhesive layer provided on at least one side of the cross-linked polyolefin resin foam.

8. A layered product comprising:
the cross-linked polyolefin resin foam according to claim 1; and
a transparent film layer provided on at least one side of the cross-linked polyolefin resin foam.

9. A layered product comprising:
the cross-linked polyolefin resin foam according to claim 1; and
at least one layer of a printed layer and a printed film provided on at least one side of the cross-linked polyolefin resin foam.

10. A formed product obtained by forming the cross-linked polyolefin resin foam according to claim 1.

11. The formed product according to claim 10, wherein a skin material is layered on the cross-linked polyolefin resin foam.

12. The formed product according to claim 10, wherein the formed product is an automobile interior material.

13. A display member comprising the cross-linked polyolefin resin foam according to claim 1.

14. The display member according to claim 13, comprising a sensor element.

\* \* \* \* \*